United States Patent
Ou (10) Patent No.: US 8,218,310 B2
(45) Date of Patent: Jul. 10, 2012

(54) SHOCKPROOF ASSEMBLY FOR FLAT STORAGE DEVICE

(75) Inventor: Po-Yi Ou, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 344 days.

(21) Appl. No.: 12/477,047

(22) Filed: Jun. 2, 2009

(65) Prior Publication Data

US 2010/0301719 A1 Dec. 2, 2010

(51) Int. Cl.
*H05K 5/00* (2006.01)
*H05K 7/16* (2006.01)
*A47B 81/00* (2006.01)

(52) U.S. Cl. ......... 361/679.34; 361/679.33; 361/679.36; 361/679.37; 361/679.39; 361/679.38; 361/726; 361/727; 312/223.2

(58) Field of Classification Search ............ 361/679.31–679.45, 679.55–679.6, 361/724–727, 679.17, 679.3, 724–727; 312/223.1, 312/223.2; 211/26; 439/60, 151–160, 327, 439/328, 331, 638; 369/75.11, 75.21, 76, 369/77.11, 77.21, 78, 79, 80, 81, 82
See application file for complete search history.

(56) References Cited

U.S. PATENT DOCUMENTS

| | | | | |
|---|---|---|---|---|
| 6,141,222 A | * | 10/2000 | Toor et al. | 361/726 |
| 2003/0011980 A1 | * | 1/2003 | Albrecht et al. | 361/685 |
| 2004/0130866 A1 | * | 7/2004 | Itakura et al. | 361/685 |
| 2007/0025014 A1 | * | 2/2007 | Kim | 360/97.01 |

* cited by examiner

*Primary Examiner* — Jayprakash N Gandhi
*Assistant Examiner* — Jerry Wu (57) ABSTRACT

A shockproof assembly, preventing a flat storage device from shock damage, includes a housing, a bracket, and at least one first buffer. The housing has a bottom plate and a top plate coupled to each other correspondingly and covering the flat storage device. The bracket has a plurality of side blades extended along an extending direction, and the bracket is coupled the side wall of the flat storage device. A first buffer store space is defined among the side blades and the bottom plate of the housing. The first buffer is disposed in the first buffer store space and has a preset height for keeping a preset interval between the bottom face of the flat storage device and the bottom plate. Shock is absorbed by the first buffer during being transmitted to the flat storage device via the housing when the shockproof assembly is shaken.

18 Claims, 7 Drawing Sheets

SHOCKPROOF ASSEMBLY FOR FLAT STORAGE DEVICE

FIELD OF THE INVENTION

The present invention relates to a shockproof assembly, and more particularly to a shockproof assembly adopted for a flat storage device.

BACKGROUND

Nowadays, computers have been used popularly in a variety of business occasions and people's livelihood requirements and enable work efficiency, activity effect of industry and commerce and convenient life conditions to be optimized. Particularly, the portable hardware facilities of computer peripherals can provide a user with convenience.

A portable hardware facility is frequently shocked or dropped down when it is carried by a user or placed in a vehicle, and important data in the portable hardware facility is damaged if the portable hardware facility is shocked or dropped down, it will causes the user a great loss. This problem has already embarrassed computer manufacturers and numerous users. Therefore, computer manufacturers endeavor to develop various accommodating cases for a storage device.

A shockproof assembly in the prior art for a laptop computer hard disk includes a hard disk accommodating case. The hard disk accommodating case has a main body and a cover and a hard disk drive. The end face of one side of the main body is provided with an opening for allowing a signal transmission bus line and a power cord to be passed through it to connect to a hard disk drive. The hard disk drive is placed in the accommodating case, where the bottom and the periphery of the accommodating case are installed with an elastic buffer pads. The hard disk drive is placed in the main body of the hard disk accommodating case, and the cover is used to place on the main body, the elastic pads in the hard disk accommodating case then cover the hard disk drive. Accordingly, shock from the outside will be absorbed by the elastic buffer pads and not influence the action of inner components in the hard disk drive directly.

However, a part of the buffer pads is pressed solidly because the mass of the storage device itself is objected to gravity, causing the buffer space, which a buffer can provide the storage device with shock absorption, to be reduced and further lowering the buffer ability during outer shock is acted on the shockproof assembly for the storage device and transmitted to the storage device.

SUMMARY OF THE INVENTION

The object of the present invention is to provide a shockproof assembly, increasing the buffer space of a storage device in the shockproof assembly.

To solve the problem in the prior art, a shockproof assembly, adopted a flat storage device is provided; the shockproof assembly includes a housing, a bracket, and at least one buffer. The flat storage device has a planar direction extending laterally and outward and a vertical direction perpendicular approximately to the planar direction. The housing has an store space for accepting the flat storage device in the housing. The bracket is coupled closely to the flat storage device, and disposed with a plurality of side blades extending along the planar plane. The first buffer contacts with the side edges of the flat storage device, the inner side edges of the housing and at least one side of each side blade; and the first buffer also has a preset height along the vertical direction; the preset height exceeds the outer edge of the flat storage device.

The shockproof assembly of the present invention increases the buffer space outside the pressed part of the buffer after the buffer is influenced and pressed solidly by gravity due to the mass of the flat storage device, allowing the flat storage device to obtain a better buffering effect in the shockproof assembly and further achieving a better buffering capability of the shockproof assembly. Furthermore, in another preferred embodiment of the present invention, the buffer is filled at the two sides of the side blade of the bracket, ensuring that the shockproof assembly obtains the best buffering effect no matter what it is placed positively or reversely.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
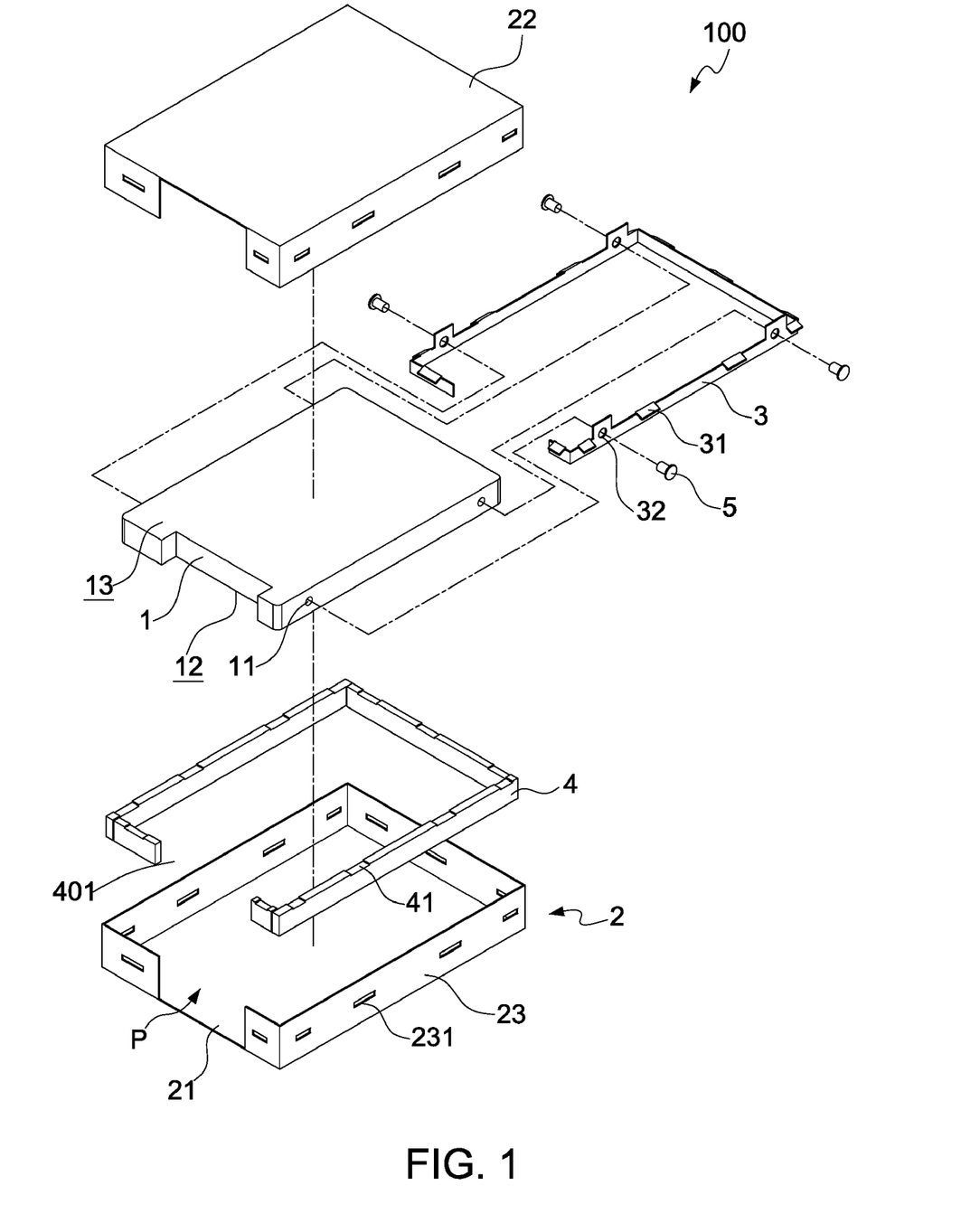
FIG. 1 is an exploded view of a first embodiment according to the present invention.

FIG. 1 is an exploded view of a first embodiment according to the present invention. As the figure shows, a shockproof assembly 100 is adopted to a flat storage device 1 with a relatively smaller height. The flat storage device 1 has a planar direction D1 extending laterally and outward (refer to FIG. 4 as well) and a vertical direction D2 approximately perpendicular to the planar direction D1. The shockproof assembly 100 includes a housing 2, a bracket 3, and at least one first buffer 4. The housing 2 has a bottom plate 21, a top plate 22, and a side plate 23. The plates form an store space P among them. The side plate 23 of the housing 2 is formed perpendicular to the side edge of the bottom plate 21 and coupled to the top plate 22. The bracket 3 is coupled to the side edge of the flat storage device 1 closely and has a plurality of side blades 31 and at least one retaining hole 32. Each side blade 31 of the bracket 3 is extended out along a extending direction D3 corresponding to the planar direction D1, and the retaining hole 32 of the bracket 3 corresponds to a positioning hole 11 formed on the side wall of the flat storage device 1, wherein a positioning structure 5 is used to couple the bracket 3 to the side wall of the flat storage device 1. The positioning structure 5 is a bolt passed through the retaining hole 32 of the bracket 3 and the positioning hole 11 of the flat storage device 1 to couple the bracket 3 to the side wall of the flat storage device 1 in the present embodiment. The flat storage device 1 used in the present invention is a hard disk, a solid state disk (SSD), an optical disk drive, or the like.

The first buffer 4 is formed into a U-typed body along the inner side of the housing 2 and has a breach 401. The first buffer 4 has at least one first groove 41 and causes the flat storage device 1 and the bracket 3 to be positioned in the housing 2. The first groove 41 of the first buffer 4 corresponds to the side blade 31 of the bracket 3 and is used to couple the side blade 31 of the bracket 3 to the first buffer 4 securely. In the present embodiment, the first buffer 4 is coupled to the side blade 31 of the bracket 3 through a glue layer 6 or the like.

Figure 2:
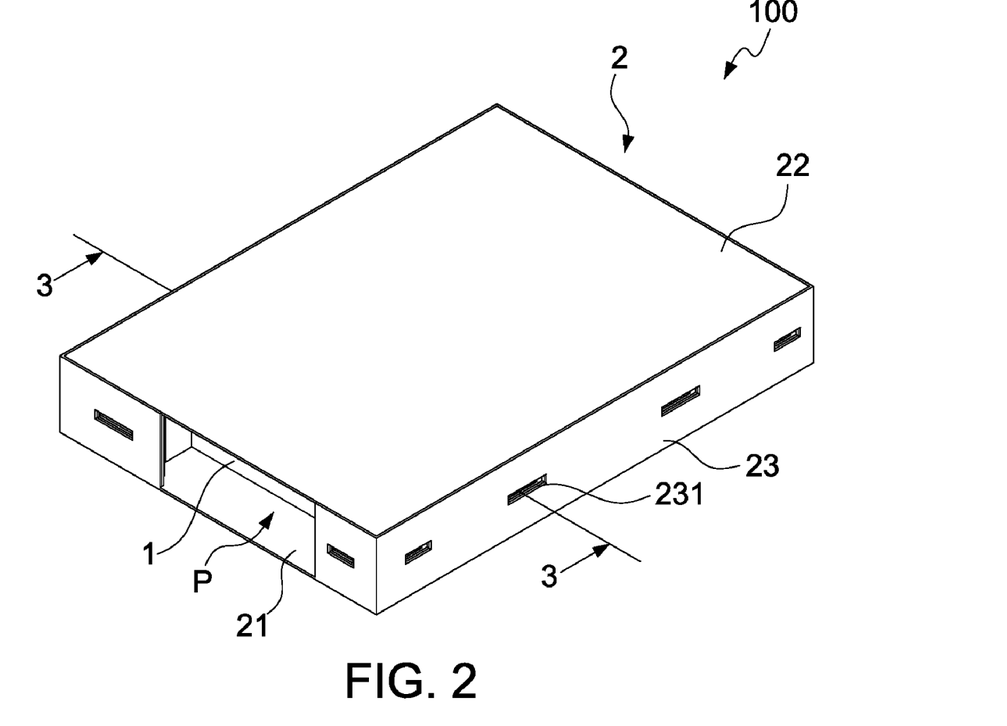
FIG. 2 is a perspective view of the first embodiment according to the present invention.
Figure 3:
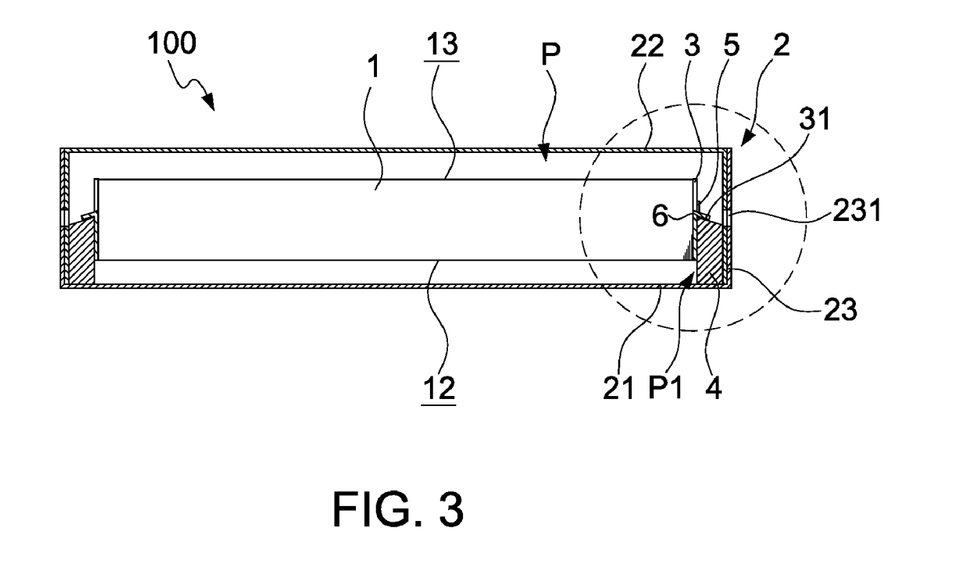
FIG. 3 is a cross-sectional view along line 3-3 of FIG. 2.

Please refer to FIGS. 2 and 3. FIG. 2 is a perspective view of the first embodiment according to the present invention. FIG. 3 is a cross-sectional view along line 3-3 of FIG. 2. A first buffer store space P1 is defined along the vertical direction D2 (please refer to FIG. 4 as well) between the side blade 31 of the bracket 3 and the bottom plate 21 of the housing 2. The first buffer 4 is disposed in the first buffer store space P1 (i.e. the first buffer 4 is disposed among the bottom plate 21, the side edge of the flat storage device 1, the inner side edge of the housing 2 and each side blade 31). And the first buffer 4 contacts with the side blade 31 and the bottom plate 21. Furthermore, the first buffer 4 has a preset height L, and the first buffer 4 keeps a preset interval H is between the bottom face 12 of the flat storage device 1 and the bottom plate 21. In the present embodiment, the side plate 23 of the housing 2 is opened with a through hole 231 corresponding to the extending direction D3 of each side blade 31 of the bracket 3. The through hole 231 ensures that the side blade 31 of the bracket 3 is prevented from colliding with the side plate 23 of the housing 2 when the shockproof assembly 100 is objected to a transverse shock. Furthermore, the extending direction D3 of the side blade 31 of the bracket 3 is designed to form a preset angle with the planar direction D1. The preset angle may be from 0 to 90 degree (±5 degree) and may be adjusted depending on a practical need. An acute angle (smaller than 90 degree) has a relatively better structure strength for the side blade 31. The included angle between the extending direction D3 and the planar direction D1 is 30 degree in the present embodiment. On this account, it ensures that the first buffer 4 absorbs more shock component through the included angle between the extending direction D3 of the side blade 31 and the planar direction D1 when the flat storage device 1 vibrates to and fro between the bottom plate and the top plate 22 of the housing 2.

Figure 4:
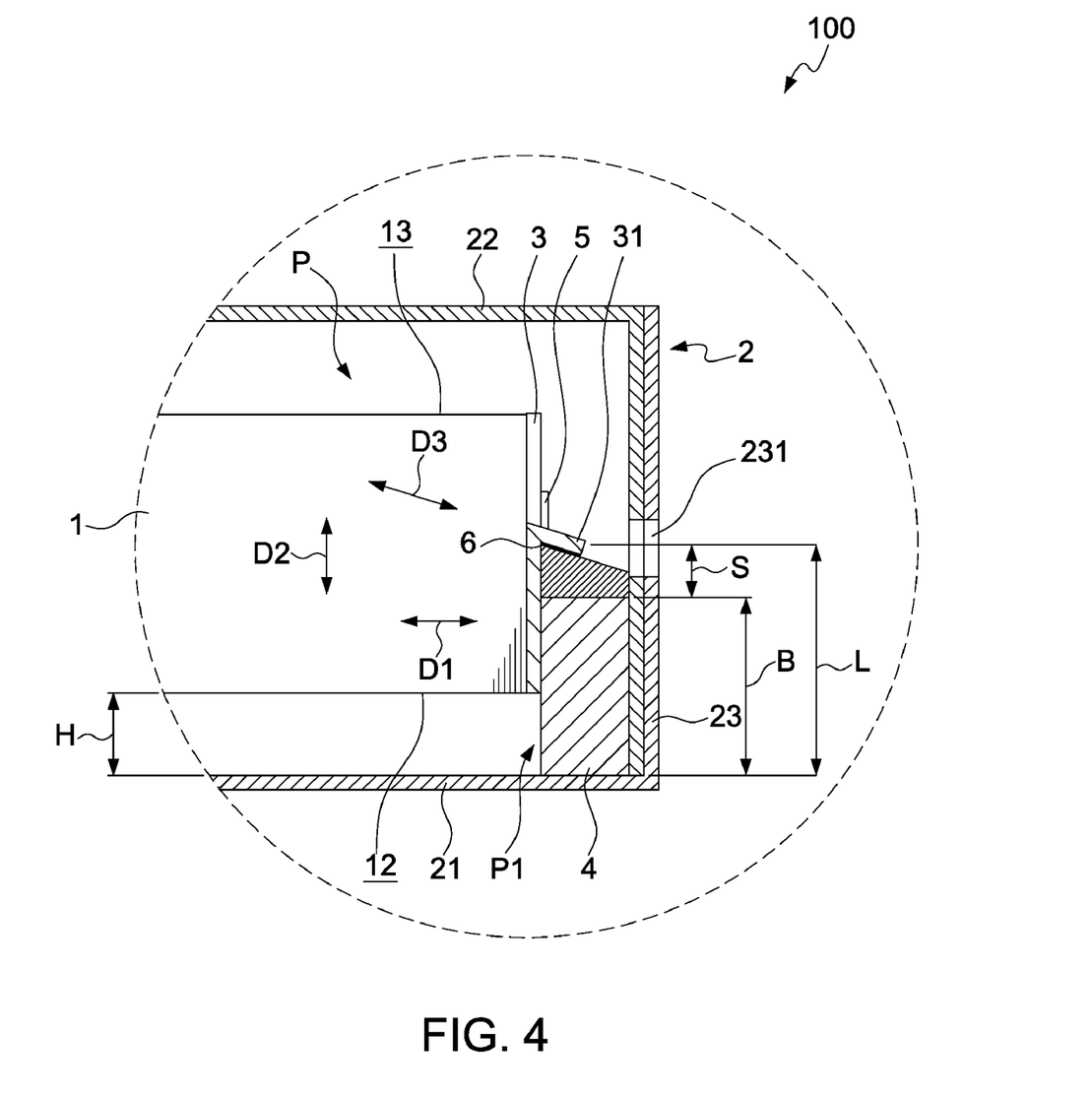
FIG. 4 is a partly enlarged view of FIG. 3.

FIG. 4 is a partly enlarged view of FIG. 3 according to the present invention. As the figure shows, the flat storage device 1 is objected to gravity to compress the first buffer 4. The first buffer 4 is partly pressed to generate a solidly-pressed space S due to the mass of the flat storage device 1 and a buffer space B remains in the first buffer 4 outside the solidly-pressed space S; the buffer space B is used for absorbing the shock acted on the shockproof assembly 100.

Figure 5:
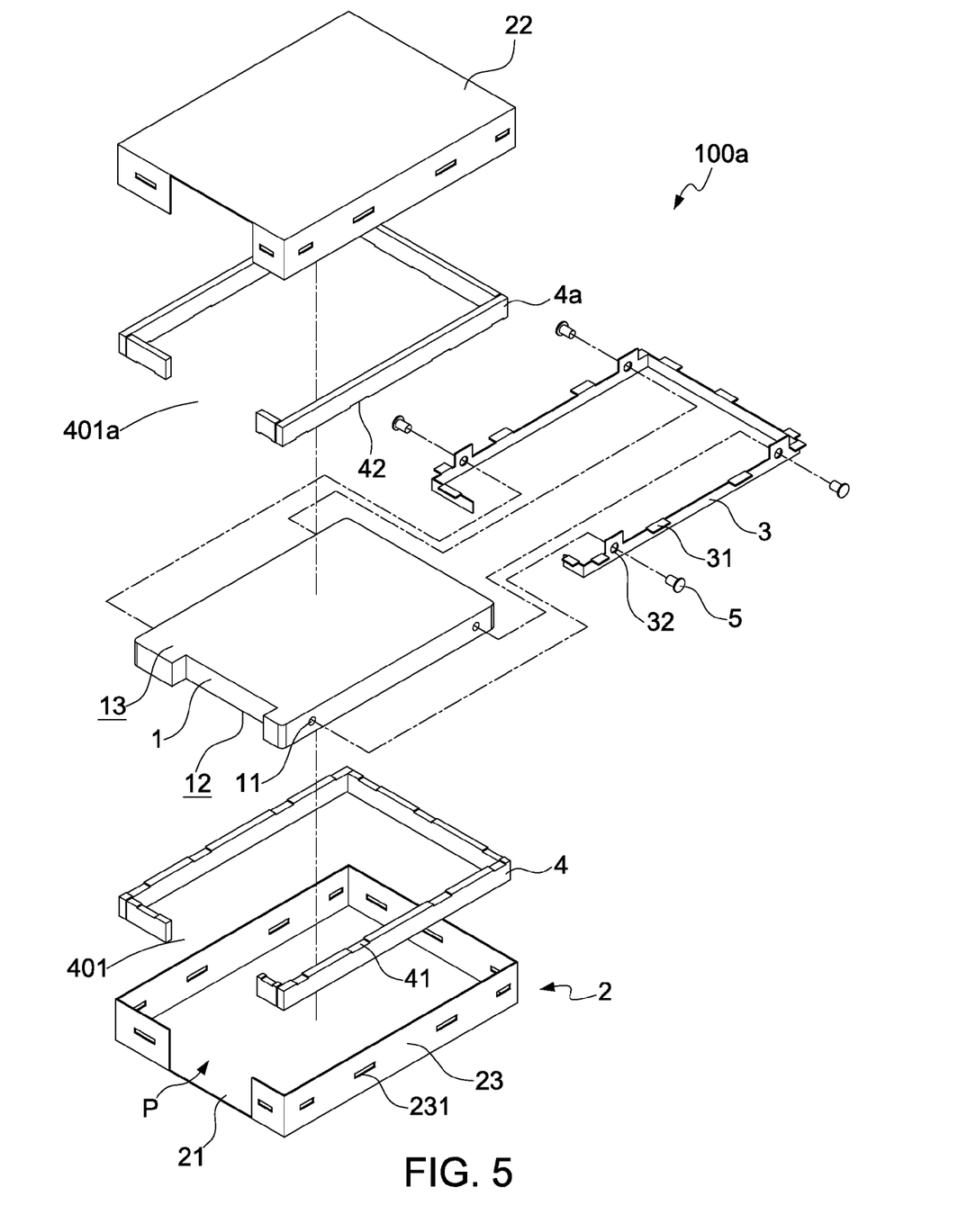
FIG. 5 is an exploded view of a second embodiment according to present invention.
Figure 6:
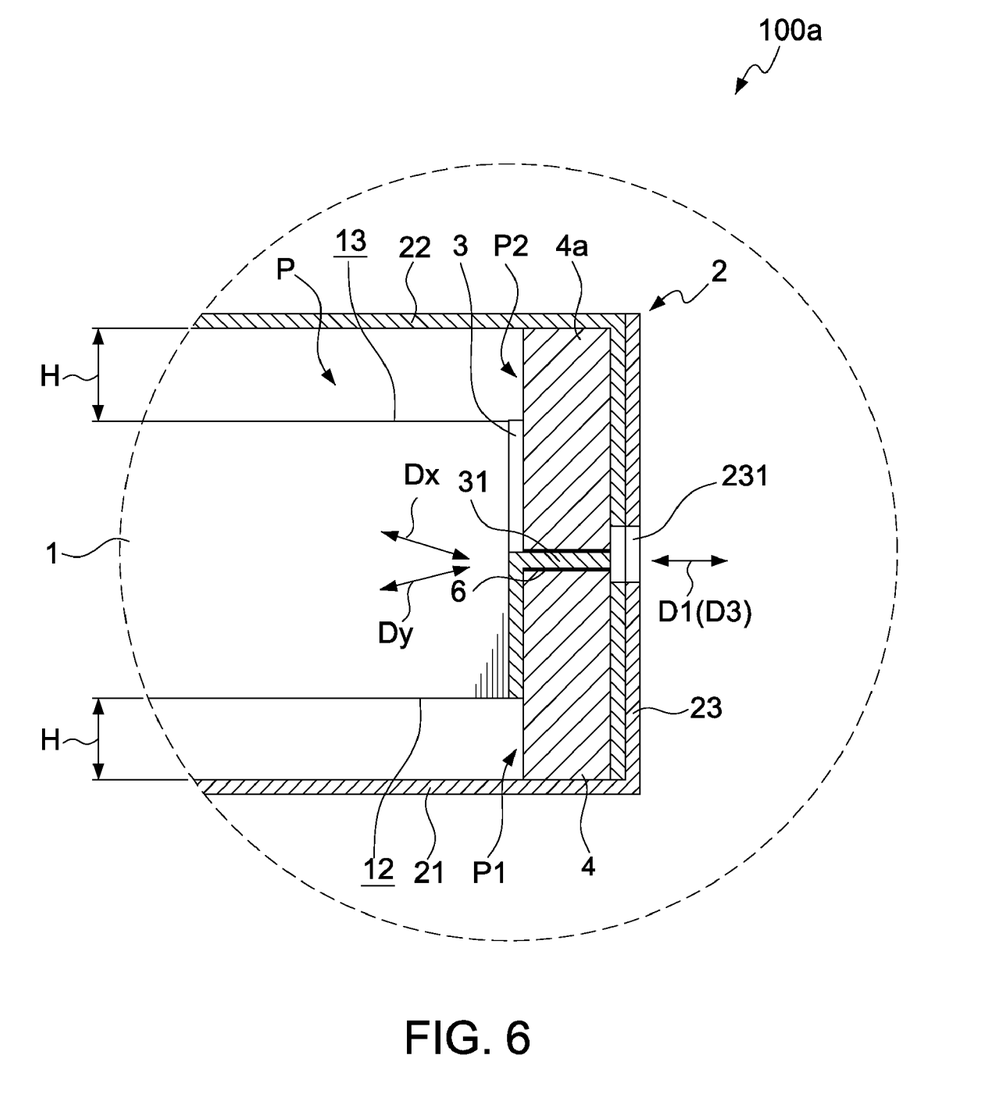
FIG. 6 is a partly enlarged cross-sectional view of the second embodiment according to the present invention.

Comparing the present invention with the prior art, it can be seen obviously that the range of the buffer space B of the first buffer 4 of the present invention is broader than the prior art under a condition that the space occupied by the solidly-pressed spaces S of the present invention and the prior art are the same such that the present invention can provide a better and more stable buffering capability, because the first buffer 4 is disposed in the first buffer store space P1, and the side edge of the flat storage device 1 is coupled to the side blade 31 of the bracket 3 and mounted on the first buffer 4. The buffer is not disposed directly between the flat storage device 1 and the housing 2 according to the present invention Please refer to FIGS. 5 and 6. FIGS. 5 and 6 respectively show an exploded view and a partly enlarged cross sectional view of a second preferred embodiment according to the present invention. The second embodiment is similar to the first embodiment, such that the same components are marked with the same numeral, and the detailed description about them is hereby omitted. The difference between the second embodiment and the first embodiment is that a shockproof assembly 100a of the present invention further includes a second buffer 4a. The second buffer 4a is also formed as a U-typed body along the inner side edge of the housing 2 and has a second breach 401a. The second buffer 4a is disposed in a second buffer store space P defined between the top plate 22 of the housing 2 and the side blade 31 of the bracket 3. The second buffer 4a is symmetrical to the first buffer 4 and has a second groove 42 corresponding to the first groove 41 of the first buffer 4, so as to provide a buffering capability different from the one of the first buffer for the flat storage device 1 and allow a preset interval H to be kept between a top face 13 of the flat storage device 1 and the top plate 22 of the housing 2. Comparing with the first embodiment, the extending direction D3 of the side plate 31 is parallel to the planar direction D1 in the present embodiment so that a shock component can be distributed equally to the first buffer 4 and the second buffer 4a.

The extending directions of each two side blades 31 is similar to each other or different to each other among the plurality of side blades 31, i.e. some of side blades 31 may be pointed downward with an acute angle, others may be pointed upward with an acute angle (extending directions Dx and Dy shown in FIG. 6); it is enough only if at least one of the first buffer 4 and the second buffer 4a provides a supporting force.

Figure 7:
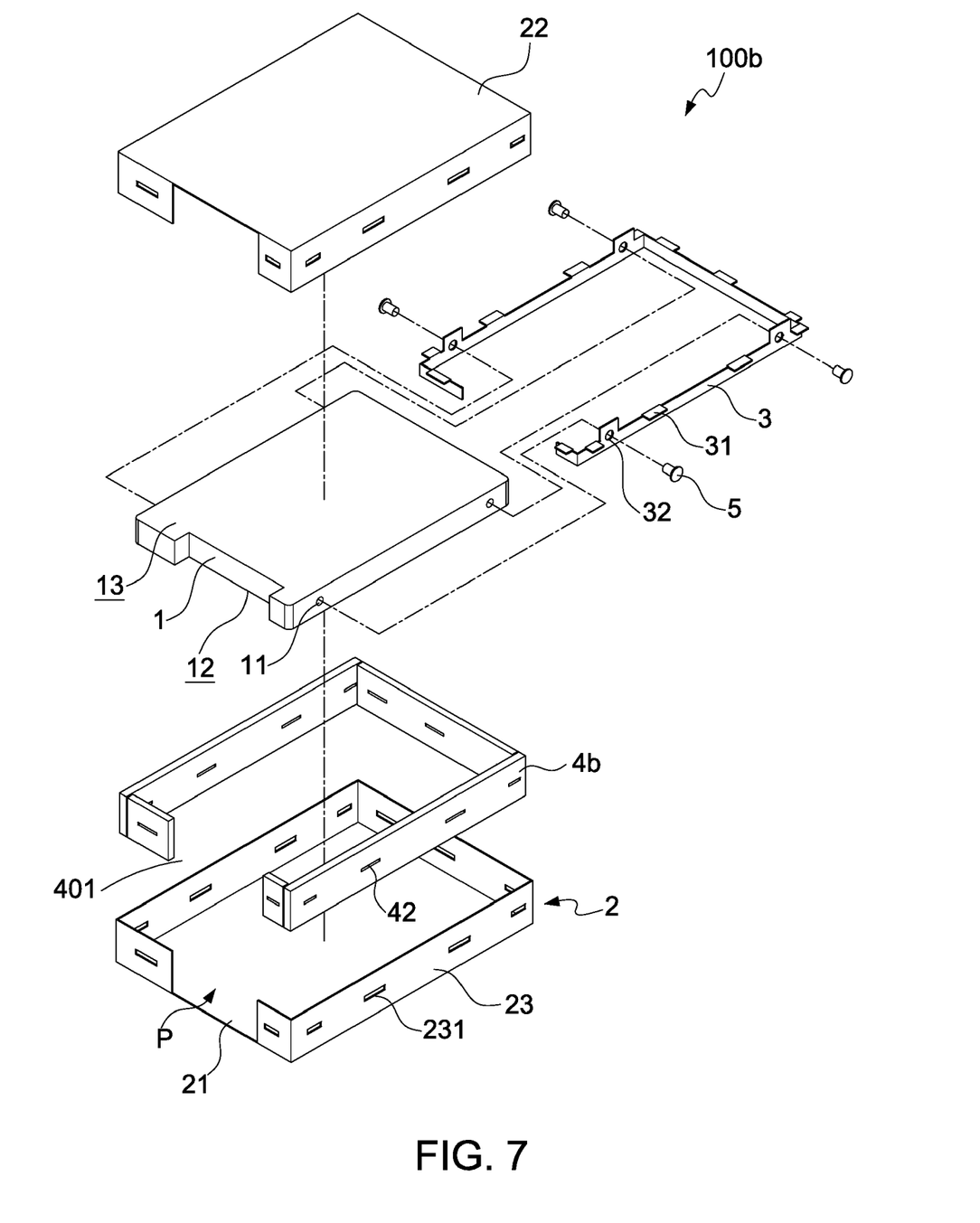
FIG. 7 is an exploded view of a third preferred embodiment according to the present invention.
Figure 8:
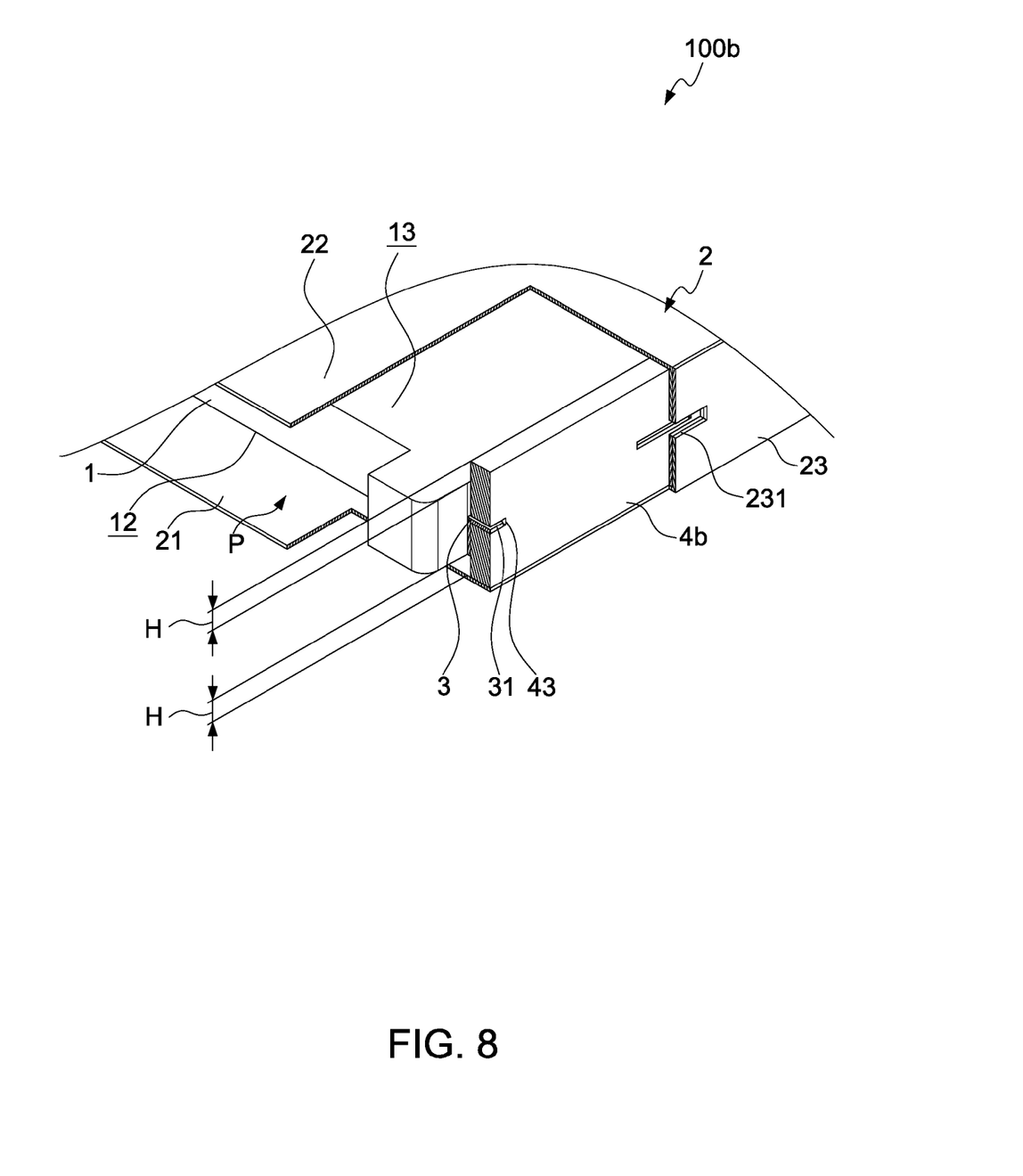
FIG. 8 is a half cutaway perspective view of the third preferred embodiment according to the present invention.

Please refer to FIGS. 7 and 8. FIGS. 7 and 8 respectively show an exploded view and a half cutaway perspective view of a third preferred embodiment according to the present invention. The third embodiment is similar to the second embodiment, such that the same components are marked with the same numeral, and the detailed description about them is hereby omitted. The difference between them is that a third buffer 4b of a shockproof assembly 100b of the present embodiment is a component formed by forming the first buffer 4 monolithically with the second buffer 4a to cover the flat storage device 1. In addition, the first groove 41 of the first buffer 4 and the second groove 42 of the second buffer 4a respectively correspond to the side blade 31 and combine with each other to form a through hole 43, ensuring each side blade is inserted therein.

In the aforementioned embodiments, the first buffer 4 basically keeps a preset interval H between the bottom face 12 of the flat storage device 1 and the bottom plate 21 of the housing 2; the second buffer 4a also has the same effect. Namely, the preset height L exceeds the upper edge and the lower edge of the flat storage device 1, or simply speaking, the outside edge of the flat storage device 1, and the buffering and supporting effects can then be provided.

The first buffer 4 is formed into the U-typed body around the inner side edge of the housing 2 and has the first breach 401; the second buffer 4a also has the similar structure. But the present invention does not limit the first buffer or the second buffer being the U-typed body, and does not define the number of either, for example, the first/second buffer 4/4a with three straight sheets may support three sides (left, right and rear sides) of the flat storage device 1; it is unnecessary to be a continuous U-typed body. Otherwise, the first/second buffer 4/4a with only two straight sheets may be used to support the left and right sides of the flat storage device 1 symmetrically. Otherwise, the first/second buffer 4/4a with four straight sheets may be used to support all the four sides (left, right, front and rear sides) of the flat storage device 1. Furthermore, the first/second buffer 4/4a is L-typed; it may be disposed around the corner of the flat storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A shockproof assembly, for preventing a flat storage device from shock damage, the flat storage device having a planar direction and a vertical direction, the planar direction extending laterally and outward and the vertical direction approximately perpendicular to the planar direction, the shockproof assembly comprising:
   a housing, having a store space for accepting the flat storage device therein;
   a bracket, coupled to the flat storage device closely, and a plurality of side blades of the bracket being extended along the planar direction; and
   at least one first buffer, contacting with a side edge of the flat storage device, an inner side edge of the housing and at least one side of each side blade, the first buffer having a preset height along the vertical direction, the preset height exceeding out of an outer edge of the flat storage device in the vertical direction so as to maintain a preset interval between a bottom edge of the flat storage device and the housing;
   wherein the buffer is provided with a plurality of grooves, each groove arranged to accept one single side blade such that it is supported in the vertical direction without contacting any portion of the housing; and
   wherein the housing comprises a plurality of through holes arranged corresponding to the plurality of side blades and to the preset height of the buffer at each groove so as to prevent collision of the side blades with the housing when the first buffer is compressed due to shock in the planar direction.

2. The shockproof assembly as claimed in claim 1, wherein the housing has a bottom plate, the first buffer is disposed among the bottom plate, the side edge of the flat storage device, the inner side edge of the housing, and each side blade.

3. The shockproof assembly as claimed in claim 2, wherein the preset interval is between a bottom face of the flat storage device and the bottom plate, the first buffer provides a supporting force to maintain the preset interval, and the preset height is larger than the preset interval.

4. The shockproof assembly as claimed in claim 1, wherein the included angle between the extending direction of the side blade and the planar direction is 0 to 90 degree±5 degree.

5. The shockproof assembly as claimed in claim 1, wherein the housing further comprises a top plate, a second buffer is further disposed among the housing, the flat storage device, the top plate, and the side blade, and the second buffer and the first buffer clamps at least one of the side blades.

6. The shockproof assembly as claimed in claim 5 wherein the first buffer is formed monolithically with the second buffer.

7. The shockproof assembly as claimed in claim 5, wherein the second buffer has a plurality of second grooves, and each second groove accepts one single side blade.

8. The shockproof assembly as claimed in claim 5, wherein the second buffer is coupled to the side blade of the bracket through a glue layer.

9. The shockproof assembly as claimed in claim 5, wherein the second buffer is formed into a U-typed structure along the inner side edge of the housing, and has a second breach.

10. The shockproof assembly as claimed in claim 1, wherein the first buffer is formed into a U-shaped body along the inner side edge of the housing, and has a first breach.

11. The shockproof assembly as claimed in claim 1, wherein the housing further has a side plate, a through hole is opened on the side plate corresponding to the extending direction of each side blade, and each through hole corresponds to one of the side blades.

12. The shockproof assembly as claimed in claim 1, wherein the first buffer is coupled to the side blade of the bracket through a glue layer.

13. The shockproof assembly as claimed in claim 1, wherein an included angle between the extending direction of each side blade and the planar direction is a similar preset angle.

14. The shockproof assembly as claimed in claim 1, wherein an included angle between the extending direction of each side blade and the planar direction is a different preset angle.

15. The shockproof assembly as claimed in claim 1, wherein an included angle between the extending direction of the side blade and the planar direction is an acute angle.

16. The shockproof assembly as claimed in claim 1, wherein the first buffer is a straight sheet, disposed at one side of the flat storage device.

17. The shockproof assembly as claimed in claim 1, wherein the first buffer is an L-shaped body, disposed around one corner of the flat storage device.

18. The shockproof assembly as claimed in claim 1, wherein the bracket is coupled to the side edge of the flat storage device closely.

* * * * *